United States Patent
Lu et al.

(10) Patent No.: US 10,381,866 B2
(45) Date of Patent: Aug. 13, 2019

(54) LIGHT EMITTING DIODE EMERGENCY LIGHT WITH TRANSPORTATION MODE AND OPERATION METHOD THEREOF

(71) Applicant: Xiamen PVTECH Co., Ltd., Xiamen, Fujian (CN)

(72) Inventors: Fuxing Lu, Fujian (CN); Rongtu Liu, Nanan (CN)

(73) Assignee: Xiamen PVTECH Co., Ltd., Xiamen, Fujian (CN)

( * ) Notice: Subject to any disclaimer, the term of this patent is extended or adjusted under 35 U.S.C. 154(b) by 148 days.

(21) Appl. No.: 15/353,746

(22) Filed: Nov. 17, 2016

(65) Prior Publication Data
US 2018/0026476 A1    Jan. 25, 2018

(30) Foreign Application Priority Data
Jul. 22, 2016    (CN) .......................... 2016 1 0579537

(51) Int. Cl.
*H02J 9/02* (2006.01)
*F21S 9/02* (2006.01)
(Continued)

(52) U.S. Cl.
CPC ............... *H02J 9/02* (2013.01); *F21K 9/275* (2016.08); *F21K 9/278* (2016.08); *F21S 9/022* (2013.01);
(Continued)

(58) Field of Classification Search
CPC ..... F21Y 2115/10; F21S 9/022; H02J 7/0068; H02J 9/02; H02J 7/345; H02J 7/0052;
(Continued)

(56) References Cited

U.S. PATENT DOCUMENTS 3,890,555 A * 6/1975 Nelson .................... H02J 7/027
320/165
6,307,332 B1 * 10/2001 Noguchi ................ H05B 37/03
315/360
(Continued)

FOREIGN PATENT DOCUMENTS

CA      2908190 A1 *  4/2016
CN    203912259 U  * 10/2014
(Continued)

*Primary Examiner* — Pinping Sun
(74) *Attorney, Agent, or Firm* — Winston Hsu

(57) ABSTRACT

A light emitting diode (LED) emergency light with transportation mode includes an alternating current (AC)-direct current (DC) LED driving circuit, a light source, and an emergency module, wherein the emergency module includes a battery, the AC-DC LED driving circuit is electrically connected to a terminal of the light source, and the emergency module is electrically connected to another terminal of the light source. After the emergency module generates a transportation mode signal, the LED emergency light enters the transportation mode, and a power supply circuit within the emergency module utilizing the battery to drive the light source is turned off according to the transportation mode signal. Therefore, after the LED emergency light enters the transportation mode, current consumption of the LED emergency light is decreased significantly, so the present invention greatly extends storage time of the LED emergency light during a transportation and warehouse process of the LED emergency light.

5 Claims, 5 Drawing Sheets

(51) Int. Cl.

| | |
|---|---|
| *F21V 23/02* | (2006.01) |
| *F21K 9/278* | (2016.01) |
| *F21K 9/275* | (2016.01) |
| *F21V 23/00* | (2015.01) |
| *H02J 7/00* | (2006.01) |
| *H02J 9/06* | (2006.01) |
| *H05B 33/08* | (2006.01) |
| *H05B 37/02* | (2006.01) |
| *F21V 29/70* | (2015.01) |
| *F21V 29/89* | (2015.01) |
| *F21Y 115/10* | (2016.01) |
| *F21K 9/272* | (2016.01) |
| *F21V 1/00* | (2006.01) |
| *F21V 15/015* | (2006.01) |
| *F21V 17/10* | (2006.01) |
| *H02J 7/34* | (2006.01) |

(52) U.S. Cl.
CPC ............ *F21V 23/003* (2013.01); *F21V 23/02* (2013.01); *H02J 7/0052* (2013.01); *H02J 7/0068* (2013.01); *H02J 9/061* (2013.01); *H05B 33/0854* (2013.01); *H05B 37/0227* (2013.01); *F21K 9/272* (2016.08); *F21V 1/00* (2013.01); *F21V 15/015* (2013.01); *F21V 17/101* (2013.01); *F21V 29/70* (2015.01); *F21V 29/89* (2015.01); *F21Y 2115/10* (2016.08); *H02J 7/345* (2013.01); *Y02B 20/383* (2013.01)

(58) Field of Classification Search
CPC . H02J 9/061; H05B 33/0854; H05B 37/0227; F21K 9/272; F21K 9/275; F21K 9/278; F21V 1/00; F21V 15/015; F21V 17/101; F21V 29/89; F21V 29/70; F21V 23/003; F21V 23/02; Y02B 20/383
See application file for complete search history.

(56) References Cited

U.S. PATENT DOCUMENTS

| | | | | |
|---|---|---|---|---|
| 7,444,530 | B2 * | 10/2008 | Deppe ................... | H02J 9/005 |
| | | | | 348/734 |
| 2004/0195292 | A1 * | 10/2004 | Tetuo ..................... | B23K 3/033 |
| | | | | 228/51 |
| 2009/0118604 | A1 * | 5/2009 | Phan ................... | A61B 5/14532 |
| | | | | 600/345 |
| 2011/0187517 | A1 * | 8/2011 | Roths ......................... | B62J 6/00 |
| | | | | 340/432 |
| 2013/0009698 | A1 * | 1/2013 | Esnard ................... | H02J 7/0031 |
| | | | | 327/544 |
| 2013/0113393 | A1 * | 5/2013 | Fujita ...................... | F21S 9/022 |
| | | | | 315/297 |
| 2013/0187470 | A1 * | 7/2013 | Huang ................... | H02J 9/065 |
| | | | | 307/66 |
| 2014/0062332 | A1 * | 3/2014 | Kim ................... | H05B 37/0272 |
| | | | | 315/228 |
| 2015/0008844 | A1 * | 1/2015 | Wilson ..................... | H02J 9/02 |
| | | | | 315/291 |
| 2015/0091451 | A1 | 4/2015 | Williams | |

FOREIGN PATENT DOCUMENTS

| | | | | |
|---|---|---|---|---|
| CN | 204335092 U | * | 5/2015 | |
| CN | 205261390 U | * | 5/2016 | |
| EP | 0 813 285 A2 | | 12/1997 | |
| EP | 2508905 A2 | * | 10/2012 | ........... G01R 31/362 |
| EP | 2 866 529 A1 | | 4/2015 | |
| GB | 2499016 A | | 8/2013 | |
| JP | S52-61374 | | 5/1977 | |
| JP | 2007-200810 A | | 8/2007 | |
| JP | 2007-250474 A | | 9/2007 | |
| JP | 2011-108384 A | | 6/2011 | |
| JP | 2011-233400 A | | 11/2011 | |
| JP | 2012-243400 A | | 12/2012 | |
| JP | 2013-101785 A | | 5/2013 | |
| JP | 2014-53266 A | | 3/2014 | |
| JP | 2016-42456 A | | 3/2016 | |
| WO | 2014/062130 A1 | | 4/2014 | |

* cited by examiner

LIGHT EMITTING DIODE EMERGENCY LIGHT WITH TRANSPORTATION MODE AND OPERATION METHOD THEREOF

BACKGROUND OF THE INVENTION

1. Field of the Invention

The present invention relates to a light emitting diode (LED) emergency light with transportation mode and an operation method thereof, and particularly to an LED emergency light and an operation method thereof that can make current consumption of the LED emergency light in a transportation mode be decreased significantly.

2. Description of the Prior Art

In general applications, lighting can be divided into emergency lighting and normal lighting. In regard to the normal lighting, current solid lighting technologies (light emitting diode (LED) lighting technologies) have become very popular, wherein an LED lamp is just one typical of the solid lighting technologies. In regard to the emergency lighting, an energy storage device for providing the emergency lighting has evolved into lithium Battery from lead-acid battery. In addition, a lighting device is mainly composed of a light source and a driving circuit. In addition, if the lighting device has an emergency lighting function, the lighting device further needs an energy storage apparatus (that is, a storage battery).

An emergency light provided by the prior art is only turned on when fire and other emergency situations happen. Because luminance provided by the emergency light is lower (usually less than 100 lm), the emergency light only provides a guidance function, rather than providing a normal lighting function, resulting in the emergency light not well guiding the crowd to escape. Further, in the lighting device, a system corresponding to the normal lighting and a system corresponding to the emergency lighting are two mutually independent systems. Therefore, the prior art has disadvantages as follows:

First, because batteries applied to the system corresponding to the emergency lighting have large volume and small capacity, most of the batteries applied to the system corresponding to the emergency lighting are external batteries (that is, the emergency light has the system corresponding to the emergency lighting is not suitable for installation). In addition, even if the batteries are built-in batteries, but because standby currents of the batteries are larger, the batteries are easily damaged by over discharge and not suitable to transportation and warehouse because of short storage time.

Second, because volume of the system corresponding to the emergency lighting is larger, some large shopping malls or places with relatively low ceiling is not suitable to install the system corresponding to the emergency lighting, and the system corresponding to the emergency lighting further needs exclusive power supply wires.

Third, utilization of the system corresponding to the emergency lighting is lower (because the system corresponding to the emergency lighting is turned on only when the supply mains is power failure), so the system corresponding to the emergency lighting occupies many cost.

Fourth, because normal lighting lamps occupy better lighting locations, lighting effect of the system corresponding to the emergency lighting is poorer (that is, the system corresponding to the emergency lighting has poorer lighting efficiency).

Therefore, the system corresponding to the emergency lighting provided by the prior art is not a well performance system.

SUMMARY OF THE INVENTION

An embodiment of the present invention provides a light emitting diode (LED) emergency light with transportation mode. The LED emergency light includes an alternating current (AC)-direct current (DC) LED driving circuit, a light source, and an emergency module, wherein the emergency module includes a battery, the AC-DC LED driving circuit is electrically connected to a terminal of the light source, and the emergency module is electrically connected to another terminal of the light source. After the emergency module generates a transportation mode signal, the LED emergency light enters the transportation mode, and a power supply circuit within the emergency module utilizing the battery to drive the light source is turned off according to the transportation mode signal.

Another embodiment of the present invention provides an operation method of an LED emergency light with transportation mode, wherein the LED emergency light includes an AC-DC LED driving circuit, a light source, and an emergency module, and the emergency module includes a battery. The operation method includes utilizing a predetermined AC voltage to power the emergency module at least once and turning off the predetermined AC voltage after the emergency module being powered within a predetermined time every time; the emergency module sampling the predetermined AC voltage to generate a high-level voltage signal; the emergency module generating a transportation mode signal according to the high-level voltage signal; and after the emergency module generates the transportation mode signal, the LED emergency light entering a transportation mode, and a power supply circuit within the emergency module utilizing the battery to drive the light source is turned off according to the transportation mode signal.

The present invention provides an LED emergency light with transportation mode and an operation method thereof. Because the LED emergency light simultaneously has a normal (energy saving) lighting function (corresponding to a normal mode of the LED emergency light) and an emergency lighting function (corresponding to an emergency mode of the LED emergency light), the LED emergency light not only can increase utilization of the LED emergency light, but can also save cost for purchasing an emergency light system. Therefore, compared to the prior art, the LED emergency light has great superiority in a place which is difficult to be installed the emergency light system alone, and can save burdens corresponding to installing the emergency light system alone and wiring. In addition, when the LED emergency light enters the transportation mode, because the LED emergency light and the operation method can make current consumption of the LED emergency light be only μA level during a transportation process, the present invention can insure that power of a battery within the LED emergency light is not exhausted in a short time.

These and other objectives of the present invention will no doubt become obvious to those of ordinary skill in the art after reading the following detailed description of the preferred embodiment that is illustrated in the various figures and drawings.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
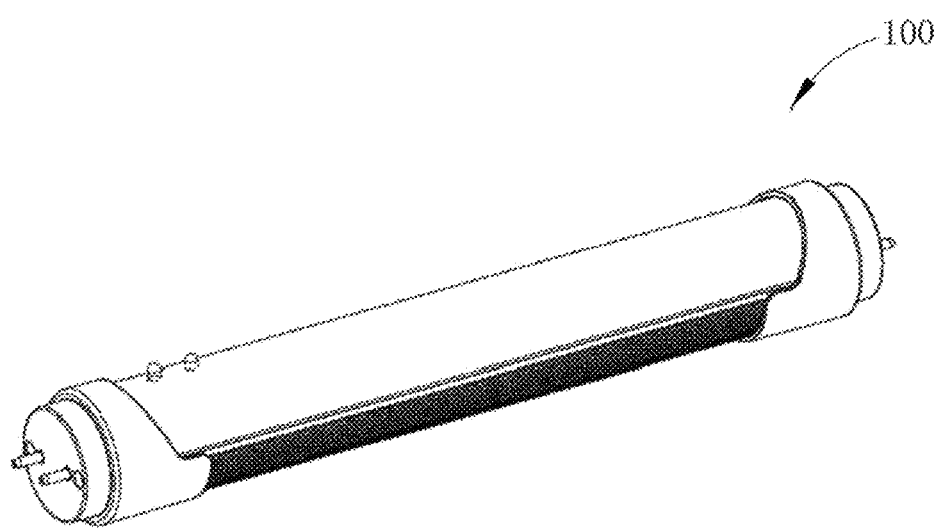
FIG. 1 is a diagram illustrating an appearance of a light emitting diode emergency light with transportation mode according to a first embodiment of the present invention.
Figure 2:
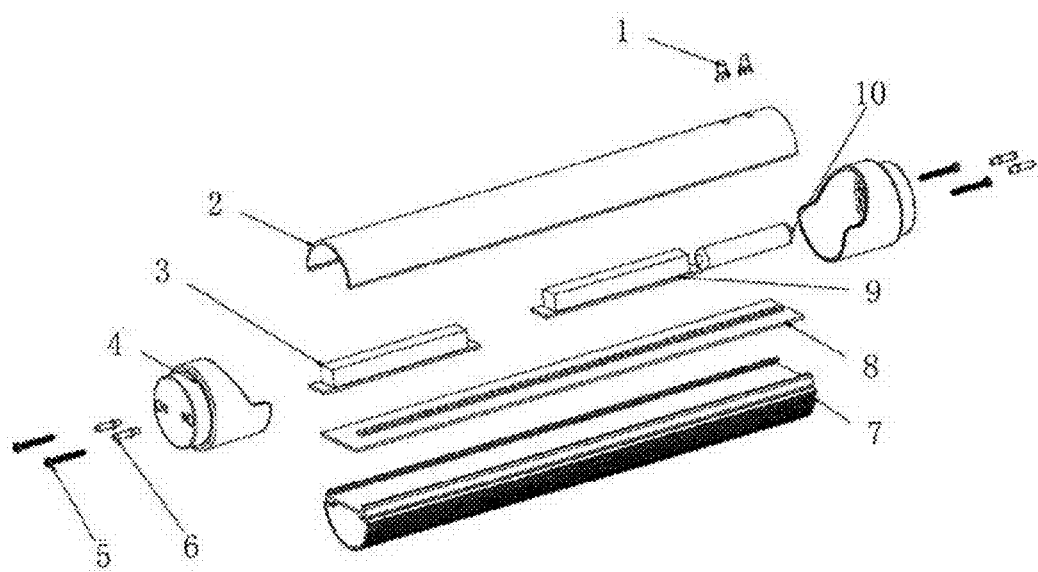
FIG. 2 is a structure explosion diagram illustrating the LED emergency light.

Please refer to FIGS. 1, 2. FIG. 1 is a diagram illustrating an appearance of a light emitting diode (LED) emergency light 100 with transportation mode according to a first embodiment of the present invention, and FIG. 2 is a structure explosion diagram illustrating the LED emergency light 100. As shown in FIG. 2, the LED emergency light 100 includes two indicator lights 1, an lampshade 2, an alternating current (AC)-direct current (DC) LED driving circuit 3, two lamp caps 4, four fixing screws 5, four copper needles 6, an aluminum radiator cover 7, a light source 8, and an emergency module 9, wherein the light source 8 is installed on a printed circuit board, the light source 8 can be an LED light source, the battery 10 is a lithium iron phosphate battery, and the emergency module 9 includes the battery 10. Because the battery 10 is a lithium iron phosphate battery, the battery 10 can operate at −20° C.~70° C. But, the present invention is not limited to the battery 10 being a lithium iron phosphate battery. That is to say, the battery 10 can also be another lithium battery with higher performance. In addition, the present invention is not limited to the LED emergency light 100 only including the two indicator lights 1 and the present invention is also not limited to the LED emergency light 100 only including the four fixing screws 5 and the four copper needles 6.

As shown in FIG. 2, the AC-DC LED driving circuit 3 is installed within the aluminum radiator cover 7, the light source 8 is fixed on a surface of the aluminum radiator cover 7, an output terminal of the AC-DC LED driving circuit 3 is electrically connected to a terminal of the light source 8, and an output terminal of the emergency module 9 is electrically connected to another terminal of the light source 8.

As shown in FIG. 2, the indicator lights 1 are inserted into indicator light holes of the lampshade 2, the lampshade 2 and the aluminum radiator cover 7 are engaged together, the lamp caps 4 and the copper needles 6 are riveted together, an input terminal of the AC-DC LED driving circuit 3 is electrically connected to the riveted lamp caps 4 and the copper needles 6, and fixed on a terminal of the aluminum radiator cover 7 through the fixing screws 5. In addition, as shown in FIG. 2, an input terminal of the emergency module 9 is electrically connected to the riveted lamp caps 4 and the copper needles 6, and fixed on another terminal of the aluminum radiator cover through the fixing screws 5. As shown in FIG. 1, according to the appearance of the LED emergency light 100, it is very obvious that the AC-DC LED driving circuit 3, the light source 8, the emergency module 9, and the battery 10 are installed within a space surrounded by the lampshade 2, the lamp caps 4, and the aluminum radiator cover 7 together.

Figure 3:
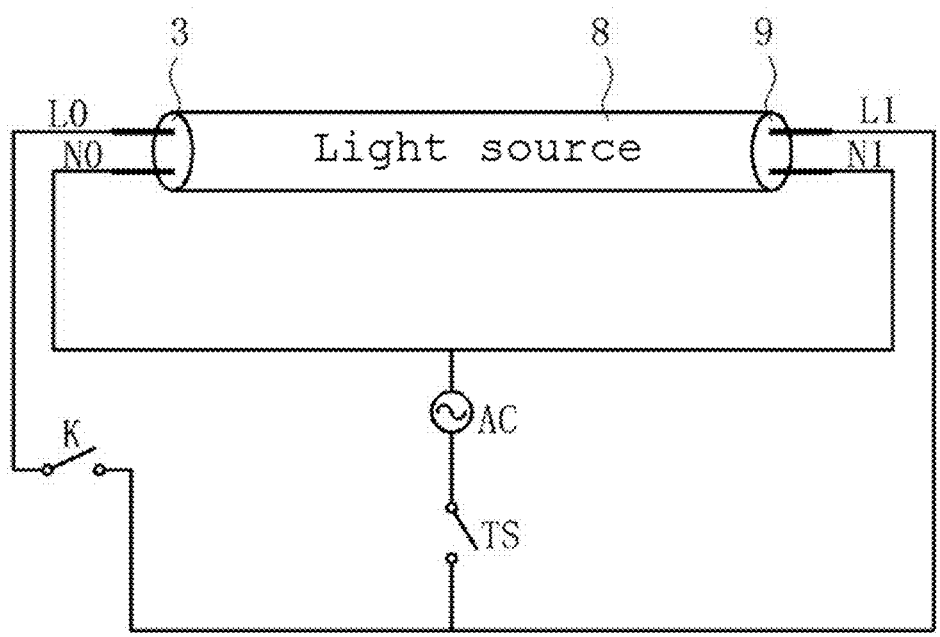
FIG. 3 is a diagram illustrating the LED emergency light being electrically connected to a supply mains.

Please refer to FIG. 3. FIG. 3 is a diagram illustrating the LED emergency light 100 being electrically connected to a supply mains AC. As shown in FIG. 3, the LED emergency light 100 and the supply mains AC further need to electrically connected to a test switch TS and a switch K, wherein the test switch TS is used for testing complete functions of the LED emergency light 100 when the LED emergency light 100 operate actually, and the switch K is applied to a normal mode of the LED emergency light 100. As shown in FIG. 3, an input terminal N0 of the AC-DC LED driving circuit 3 and an input terminal N1 of the emergency module 9 are electrically connected to a neutral wire N of the supply mains AC, an input terminal L0 of the AC-DC LED driving circuit 3 is electrically connected to a terminal of the switch K in series, another terminal of the switch K and an input terminal L1 of the emergency module 9 are electrically connected to a terminal of the test switch TS, and another terminal of the test switch TS is electrically connected to a live wire L of the supply mains AC. When the LED emergency light 100 enters the normal mode or an emergency mode, the test switch TS is turned on long-term. Therefore, when the switch K is turned on and the supply mains AC normally supplies power (meanwhile, the LED emergency light 100 enters the normal mode), the AC-DC LED driving circuit 3 can drive the light source 8 according to the supply mains AC. In addition, when the supply mains AC normally supplies power, the supply mains AC can supply power to the battery 10 of the emergency module 9 through the test switch TS, wherein the emergency module 9 does not operate when the emergency module 9 detects that the supply mains VAC normally supplies power (that is, when the emergency module 9 detects that the supply mains VAC normally supplies power, the LED emergency light 100 does not enter the emergency mode, wherein when the LED emergency light 100 enters the emergency mode, the supply mains AC stops supplying power). In addition, when the switch K is turned off, the supply mains AC still normally supplies power, but meanwhile the AC-DC LED driving circuit 3 cannot drive the light source 8 according to the supply mains AC. In addition, the AC-DC LED driving circuit 3 is a flyback converter which is obvious to one of ordinary skill in the art, but the AC-DC LED driving circuit 3 can also be another isolated driving converter which is obvious to one of ordinary skill in the art.

Figure 4:
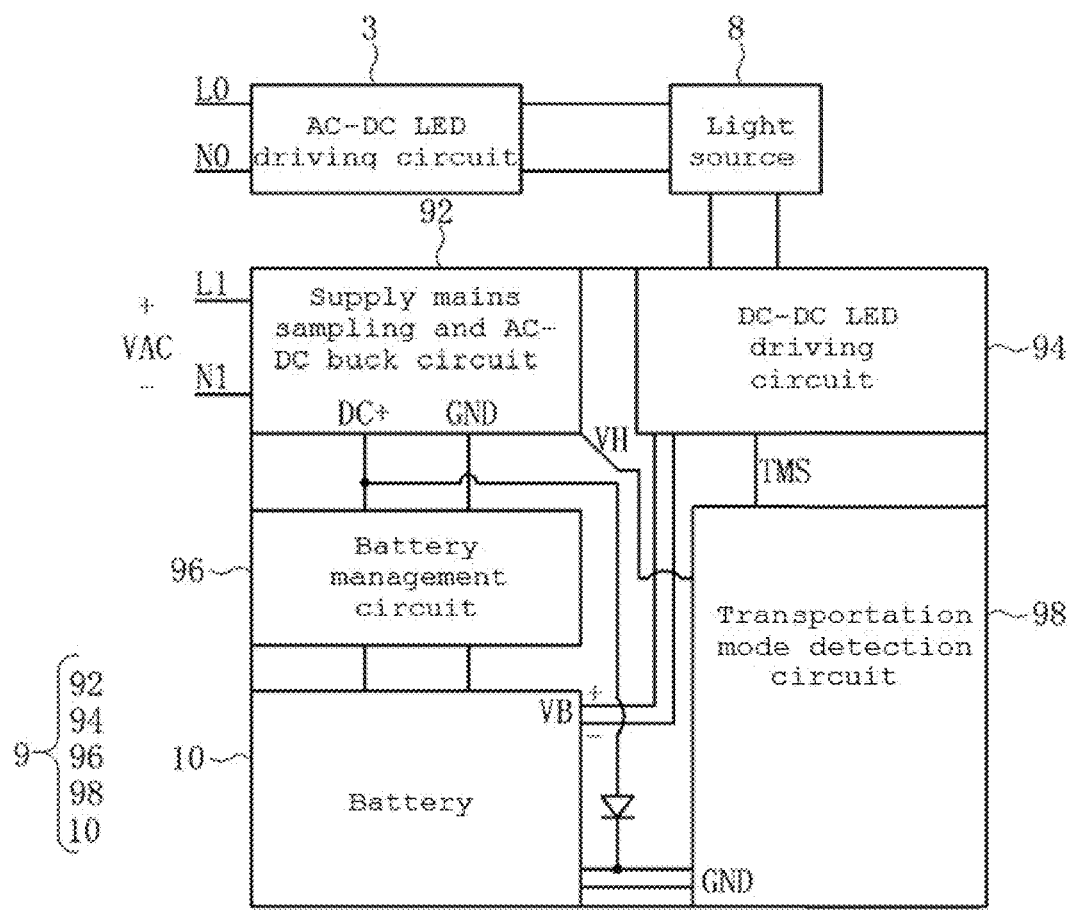
FIG. 4 is a diagram illustrating the emergency module.

FIG. 4 is a diagram illustrating the emergency module 9. As shown in FIG. 4, the emergency module 9 further includes a supply mains sampling and AC-DC buck circuit 92, a DC-DC LED driving circuit 94, a battery management circuit 96, and a transportation mode detection circuit 98. As shown in FIG. 4, when the supply mains AC supplies power to the emergency module 9, an AC voltage signal VAC outputted by the supply mains AC is first regulated by the supply mains sampling and AC-DC buck circuit 92, and then the supply mains sampling and AC-DC buck circuit 92 provides a supply voltage DC+ to the battery management circuit 96 and the transportation mode detection circuit 98 accordingly, wherein a label "GND" shown in FIG. 4 represents ground. In addition, the supply mains sampling and AC-DC buck circuit 92 also simultaneously samples the AC voltage signal VAC outputted by the supply mains AC. In addition, the supply mains sampling and AC-DC buck circuit 92, the DC-DC LED driving circuit 94, and the battery management circuit 96 are all circuits which are obvious to one of ordinary skill in the art, so further description thereof is omitted for simplicity.

Figure 5:
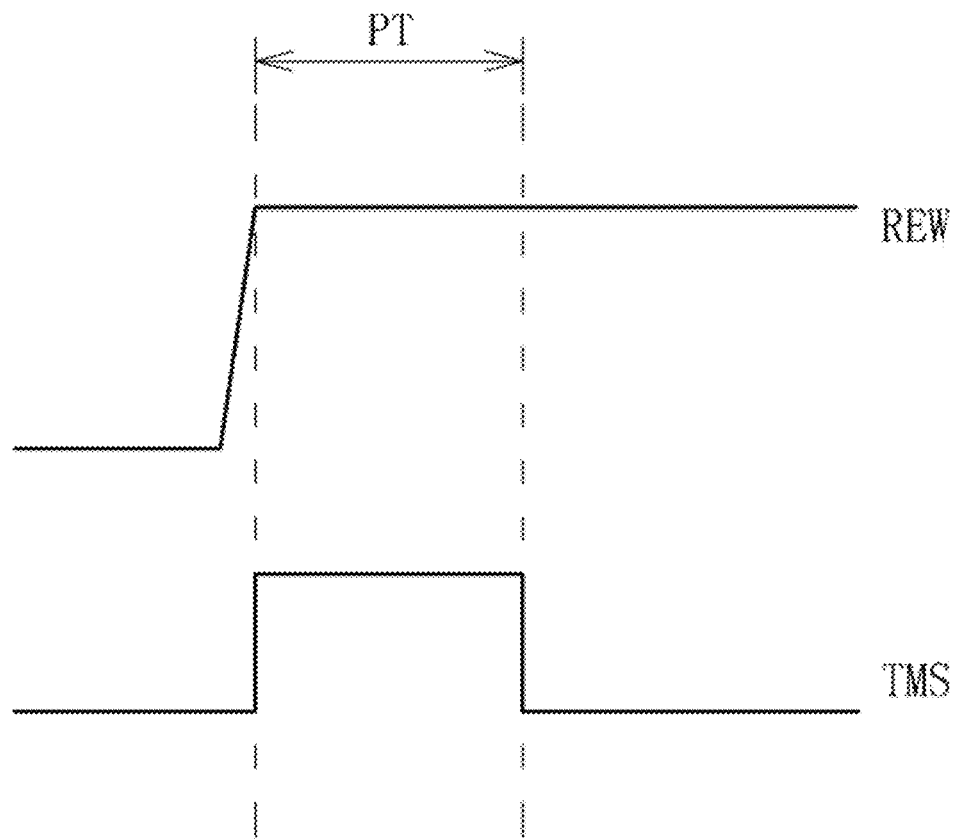
FIG. 5 is a diagram illustrating a relationship between the rising edge waveform formed by the capacitor during the charging process of the capacitor and the transportation mode signal.

After the LED emergency light 100 is shipped and needs to be transported to a destination, the LED emergency light 100 needs to enter the transportation mode. Steps of the LED emergency light 100 entering the transportation mode are shown as follows: Step 1: a user utilizes a predetermined AC voltage (can also utilize the supply mains AC) to power the emergency module 9 once and turns off the predetermined AC voltage after the emergency module 9 is powered within a predetermined time PT (e.g. 3 seconds). Meanwhile, the supply mains sampling and AC-DC buck circuit 92 samples the predetermined AC voltage to generate a high-level voltage signal VH; Step 2: the high-level voltage signal VH can charge a capacitor (not shown in FIG. 4) included in the transportation mode detection circuit 98, wherein the transportation mode detection circuit 98 can generate and output a transportation mode signal TMS (as shown in FIG. 5) to the DC-DC LED driving circuit 94 according to a rising edge waveform REW (as shown in FIG. 5) formed by the capacitor during a charging process of the capacitor; Step 3: the power supply circuit (not shown in FIG. 4) within the DC-DC LED driving circuit 94 is turned off according to the transportation mode signal TMS. Because the power supply circuit of the DC-DC LED driving circuit 94 is turned off, current consumption of the DC-DC LED driving circuit 94 falls within μA level when the DC-DC LED driving circuit 94 is in standby. Thus, when the LED emergency light 100 enters the transportation mode, because the current consumption of the DC-DC LED driving circuit 94 is 0 μA when the DC-DC LED driving circuit 94 is in standby, that power of the battery 10 is not exhausted in a short time can be sure. In addition, the present invention is not limited to the transportation mode detection circuit 98 generating and outputting the transportation mode signal TMS according to a rising edge waveform formed by the capacitor during the charging process thereof. That is to say, any configuration in which the transportation mode detection circuit 98 generates and outputs the transportation mode signal TMS according to at least one rising edge waveform formed by the capacitor during the charging process thereof falls within the scope of the present invention. In addition, the transportation mode signal TMS is further transmitted to the indicator lights 1, and the indicator lights 1 can be driven according to the transportation mode signal TMS.

In addition, as shown in FIG. 4, the battery management circuit 96 is electrically connected between the AC-DC buck circuit 92 and the battery 10 for charging the battery 10 according to the supply voltage DC+. In addition, as shown in FIG. 4, when the LED emergency light 100 enters the emergency mode, because the supply mains AC stops supplying power, the DC-DC LED driving circuit 94 drives the light source 8 according to a voltage VB provided by the battery 10.

To sum up, because the LED emergency light provided by the present invention simultaneously has a normal (energy saving) lighting function (corresponding to the normal mode of the LED emergency light) and an emergency lighting function (corresponding to the emergency mode of the LED emergency light), the LED emergency light not only can increase utilization of the LED emergency light, but can also save cost for purchasing an emergency light system. Therefore, compared to the prior art, the LED emergency light has great superiority in a place which is difficult to be installed the emergency light system alone, and can save burdens corresponding to installing the emergency light system alone and wiring. In addition, when the LED emergency light enters the transportation mode, because the LED emergency light and the operation method can make current consumption of the LED emergency light be only μA level during a transportation process, the present invention can insure that the power of the battery within the LED emergency light is not exhausted in a short time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode (LED) emergency light with a transportation mode, comprising:
    an alternating current (AC)-direct current (DC) LED driving circuit;
    a light source; and
    an emergency module, wherein the AC-DC LED driving circuit is electrically connected to a terminal of the light source, and the emergency module is electrically connected to another terminal of the light source, wherein the emergency module comprises:
    a battery;
    wherein after the emergency module generates a transportation mode signal, the LED emergency light enters the transportation mode, wherein a current consumption of the LED emergency light is only μA level during a transportation process, and the emergency module generates and outputs the transportation mode signal according to at least one rising edge waveform formed by a capacitor comprised in the emergency module during a charging process of the capacitor.

2. The LED emergency light of claim 1, further comprising:
    a plurality of indicator lights;
    a lampshade;
    two lamp caps;
    a plurality of copper needles;
    a plurality of fixing screws; and
    an aluminum radiator cover;
    wherein the AC-DC LED driving circuit is installed within the aluminum radiator cover, the light source is fixed on a surface of the aluminum radiator cover, the plurality of indicator lights are inserted into indicator light holes of the lampshade, the lampshade and the aluminum radiator cover are engaged together, the two lamp caps and the plurality of copper needles are riveted together, and the AC-DC LED driving circuit and the emergency module are electrically connected to the two lamp caps and the plurality of copper needles and fixed on the aluminum radiator cover through the plurality of fixing screws;
    wherein the AC-DC LED driving circuit, the light source, the emergency module, and the battery are installed within a space surrounded by the lampshade, the two lamp caps, and the aluminum radiator cover.

3. The LED emergency light of claim 1, wherein the battery is a lithium iron phosphate battery.

4. The LED emergency light of claim 1, wherein the AC-DC LED driving circuit is used for driving the light source according to a supply mains in a normal mode of the LED emergency light, and the emergency module utilizes the battery to drive the light source in an emergency mode of the LED emergency light, wherein when the LED emergency light enters the emergency mode, the supply mains is turned off.

5. The LED emergency light of claim 1, wherein a plurality of indicator lights are turned on according to the transportation mode signal.

* * * * *